No. 707,730. Patented Aug. 26, 1902.
C. P. STORRS.
SCREW JACK.
(Application filed June 12, 1902.)
(No Model.)

Witnesses
Hally L. Ames.
F. W. Riley.

Inventor
Charles P. Storrs
By Rexford M. Smith Attorney

THE NORRIS PETERS CO., PHOTO-LITHO., WASHINGTON, D. C.

UNITED STATES PATENT OFFICE.

CHARLES P. STORRS, OF WILMINGTON, DELAWARE.

SCREW-JACK.

SPECIFICATION forming part of Letters Patent No. 707,730, dated August 26, 1902.

Application filed June 12, 1902. Serial No. 111,376. (No model.)

*To all whom it may concern:*

Be it known that I, CHARLES P. STORRS, a citizen of the United States, residing at Wilmington, in the county of Newcastle and State of Delaware, have invented a certain new and useful Screw-Jack, of which the following is a specification, reference being had therein to the accompanying drawings.

This invention relates to screw-jacks, the principal feature of the invention residing in the combination, with the jack-screw, of a movable, detachable, and adjustable stop for limiting the upward movement of the jack-screw, thereby preventing accident and the collapsing of the jack with the load or weight resting thereon.

The invention consists in the novel construction, combination, and arrangement of parts, as hereinafter fully described, illustrated, and claimed.

Figure 1:
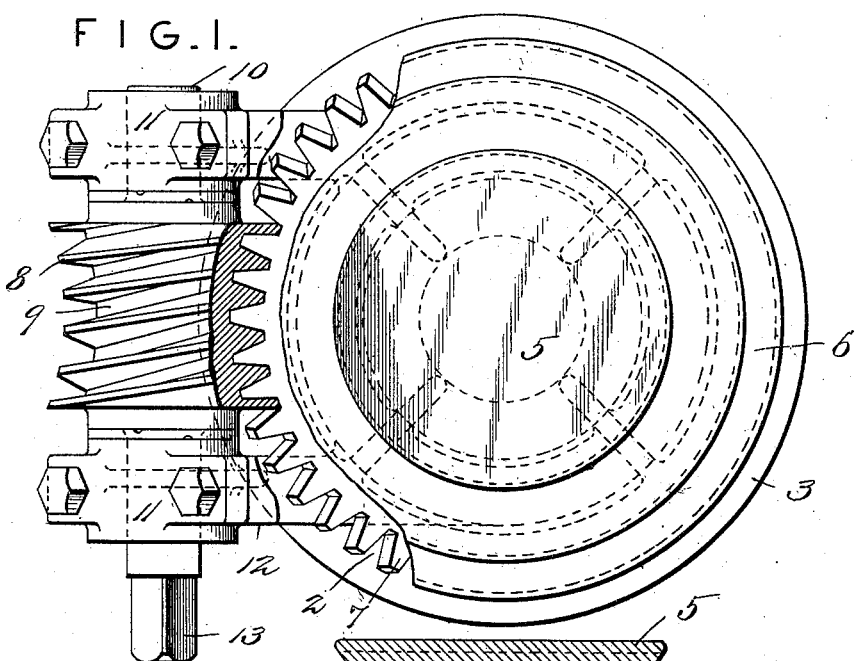
Figure 2:
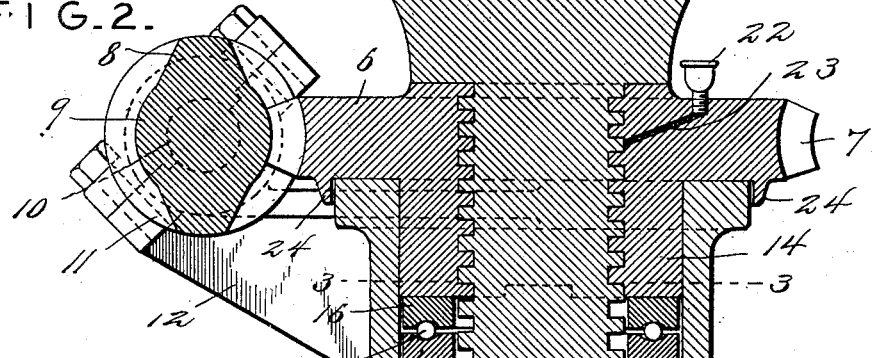
Figures 3, 4:
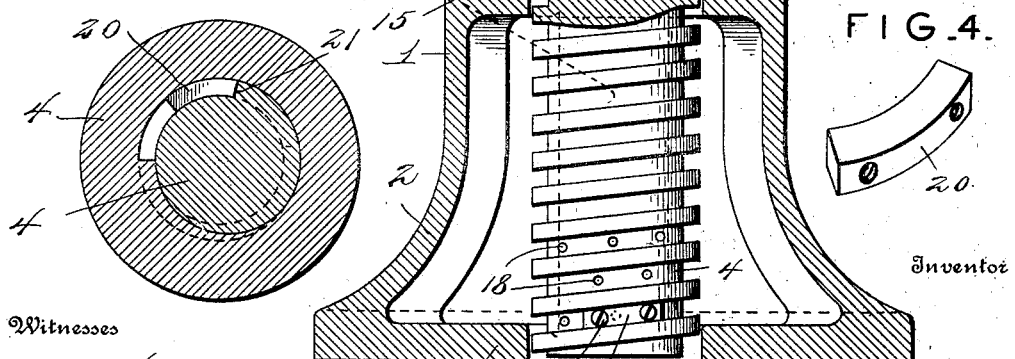

In the accompanying drawings, Figure 1 is a sectional plan view of a screw-jack constructed in accordance with the present invention. Fig. 2 is a vertical central section through the same. Fig. 3 is a horizontal section taken through the lower portion of the hub of the worm-wheel on the line 3 3 of Fig. 2. Fig. 4 is a detail perspective view of the stop or limiting-block.

Like reference-numerals designate corresponding parts in all the figures of the drawings.

Referring to the drawings, 1 designates a stand approximately cylindrical in shape and having an expanded lower portion 2, forming a broad base, upon which the stand rests. The base portion of the stand is made hollow, as shown in Fig. 2, and is provided with a series of radially and inwardly extending feet 3, which terminate at a sufficient distance apart to admit of the passage between them of the lower end of the screw-post 4, as shown in Figs. 1 and 2. The screw-post 4 extends upward centrally within the stand and is provided at its upper end with a head or rest 5. Beneath the head 5 is arranged a rotatable worm-wheel 6, which is provided around its periphery with teeth 7, that mesh with the teeth 8 of the worm 9, which extends tangentially to the worm-wheel and is mounted on a worm-shaft 10, journaled in bearings 11, carried by outwardly-extending bracket arms or lugs 12 at one side of the stand. The worm-shaft 10 is provided at one end with a square terminal portion 13 for the reception of an operating crank-handle. (Not shown.) The worm-wheel 6 is provided with a pendent hub extension 14, and both the wheel and the hub 14 are internally threaded to correspond with and receive the threads of the screw-post 4, as shown in Fig. 2, so that when the wheel 6 is turned the screw-post is acted upon thereby and fed upward or downward, according to the direction of rotation of the wheel 6.

The upper portion of the stand 1 is recessed to receive the hub 14 of the wheel 6, and said recess is made sufficiently deep to receive a ball-race ring 15 and also a superimposed cap-ring 16, the said rings 15 and 16 being provided in their opposite adjacent faces with grooves to receive a circular row of antifriction-balls 17. The rings 15 and 16 may be case-hardened to increase their durability and may be readily taken out and renewed when too far worn for further use. This enables the jack to be kept in good condition at a small expense and without renewing the more expensive parts thereof.

Between the threads at the lower portion of the screw-post 4 said post is provided with a series of threaded openings 18 for the reception of screws or like fasteners 9, which pass through openings in a detachable stop or limiting-block 20. This block is of segmental form, as shown in Fig. 4, and is adapted to be held between threads by means of the screws 19 and is capable of being adjusted to any desired point by means of the screws 19 and holes 18, so as to regulate the extent of movement of the screw-post. When the post has been turned upward to a certain point, the square-cut end of the stop 20 comes in contact with the corresponding square-cut extremity 21 of the thread within the hub portion 14 of the worm-wheel 6, as best illustrated in Fig. 3, thus bringing the feed of the screw-post to a stop before the post becomes disconnected from the worm-wheel, by means of which it is operated.

The worm-wheel 6 is provided on its upper side with an oil-cup 22, screwed into an opening in the top of the wheel and communicating with an oil hole or passage 23, which inclines downward and inward, so as to conduct the oil to the threads of the screw-post. It is preferred to partially or wholly fill the passage 23 with absorbent material, such as wicking or cotton-waste, thereby causing the oil to feed slowly and gradually to the threads. In order to exclude dust and other foreign matter from the operative parts of the jack, the worm-wheel 6 is provided on its lower side with an annular flange or rim 24, which surrounds the upper portion of the base 1, as shown in Fig. 2.

From the foregoing description it will be seen that provision is made for properly lubricating the threads of the jack and excluding dust and other foreign material from the operative parts of the machine; further, that the main antifriction-bearing, which carries the weight placed upon the jack, is cable of renewal at small expense; furthermore, the upward movement of the screw-post and the limit of the operative movement of the jack may be regulated by the adjustable stop, which is fitted between the threads of the screw-post, in the manner described and shown. The features referred to add to the practical value and utility of the jack and enable the same to be maintained in perfect working order at all times.

Having thus described the invention, what is claimed as new, and desired to be secured by Letters Patent, is—

1. In a screw-jack, the combination with a stand, of a worm-wheel mounted thereon, a worm meshing with the worm-wheel, a screw-post extending centrally through the worm-wheel and provided between the threads thereof with a series of holes, and an adjustable segmental stop fitting between the threads of the screw-post and held in place by fasteners adapted to engage the holes between the threads, substantially as described.

2. In a screw-jack, the combination with a stand, of a worm-wheel mounted thereon, a worm meshing with the worm-wheel, a screw-post passing centrally through the worm-wheel and having a threaded engagement therewith, and a segmental stop adjustably mounted between the threads of the screw-post, substantially as set forth.

In testimony whereof I affix my signature in presence of two witnesses.

CHARLES P. STORRS.

Witnesses:
REXFORD M. SMITH,
L. M. GOTWALD.